(12) United States Patent
Kim

(10) Patent No.: US 6,977,920 B1
(45) Date of Patent: Dec. 20, 2005

(54) CDMA MOBILE DATA COMMUNICATION SYSTEM AND A METHOD OF WIRELESS DATA COMMUNICATION USING THE SYSTEM

(75) Inventor: Tae Woon Kim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/055,984

(22) Filed: Apr. 7, 1998

(30) Foreign Application Priority Data

Apr. 10, 1997 (KR) .................................. 97/13291

(51) Int. Cl.[7] ............................................. H04L 12/66
(52) U.S. Cl. ...................................... 370/352; 370/466
(58) Field of Search ................................ 370/320, 323, 370/325, 335, 342, 441, 338, 352, 466, 467

(56) References Cited

U.S. PATENT DOCUMENTS

| | | | |
|---|---|---|---|
| 5,195,090 A * | 3/1993 | Bolliger et al. ............. 370/94.1 |
| 5,369,681 A * | 11/1994 | Boudreau et al. ............. 379/87 |
| 5,521,963 A * | 5/1996 | Shrader et al. ................ 349/60 |
| 5,590,133 A * | 12/1996 | Billstrom et al. ........... 370/349 |
| 5,729,536 A * | 3/1998 | Doshi et al. ................. 370/328 |
| 5,761,195 A * | 6/1998 | Lu et al. ...................... 370/329 |
| 5,850,391 A * | 12/1998 | Essigmann .................. 370/331 |
| 5,859,839 A * | 1/1999 | Ahlenius et al. ............ 370/252 |
| 5,910,946 A * | 6/1999 | Csapo ......................... 370/328 |
| 5,915,222 A * | 6/1999 | Olsson et al. ............... 455/466 |
| 5,917,816 A * | 6/1999 | Jacobsohn ................... 370/352 |
| 5,943,616 A * | 8/1999 | Andersson ................... 455/422 |
| 5,963,860 A * | 10/1999 | Muths et al. ................ 455/412 |
| 6,049,543 A * | 4/2000 | Sauer et al. ................. 370/395 |
| 6,081,706 A * | 6/2000 | Muths et al. ................ 455/412 |
| 6,091,717 A * | 7/2000 | Honkasalo et al. ......... 370/329 |
| 6,134,433 A * | 10/2000 | Joong et al. ................ 455/417 |
| 6,167,040 A * | 12/2000 | Haeggstrom ................ 370/352 |
| 6,415,410 B1 * | 7/2002 | Kanerva et al. ............. 714/749 |
| 6,570,871 B1 * | 5/2003 | Schneider ................... 370/356 |

* cited by examiner

*Primary Examiner*—Man U. Phan
*Assistant Examiner*—Toan Nguyen
(74) *Attorney, Agent, or Firm*—Fleshner & Kim, LLP

(57) ABSTRACT

A CDMA mobile data communication system and method of wireless data communication is provided for mobile-to-mobile data communication. The system may include a plurality of mobile stations, a plurality of base stations and base station controllers, a plurality of switching centers and data network interworking units. A first traffic channel may be established after a first call from a calling party mobile station to the data network interworking unit. A second traffic channel may be established after a second call from the called party mobile station to the data network interworking unit is established when a data response is transmitted from the called party mobile station and the mobile data path connection module informs the public network data path connection control module of the normal state of the first data path. A call may be established through the second data path between the mobile switching center and the data network interworking unit. The first and second traffic channels may be connected through at least one modem.

40 Claims, 12 Drawing Sheets

CDMA MOBILE DATA COMMUNICATION SYSTEM AND A METHOD OF WIRELESS DATA COMMUNICATION USING THE SYSTEM

BACKGROUND OF THE INVENTION

1. Field of the Invention

The present invention relates to a CDMA mobile data communication system and a method of wireless data communication using the system, more particularly, in the mobile data communication network of CDMA system, to the CDMA mobile data communication system and a method of wireless data communication using the system which are able to execute such a mobile-to-mobile data communication that the wireless data communication between a calling party mobile station in which an arbitrary data terminal is connected with a general mobile terminal without having any modem device and an arbitrary called party mobile station.

2. Background of the Related Art

Nowadays, since the society has been rapidly developed into a high speed information society, there have been marvelous advances in the technology of communication system. The early communication service is to provide a voice service based on a public switched telephone network (PSTN) including wire connection. However, the communication service area is not limited to voice information service but developed even to transmit data of text and image in addition to the voice service. An analog communication system has been further developed and accomplishes the communication among mobile network subscribers or between a mobile network subscriber of the analog system and a conventional wireline public switched telephone network subscriber. Since this analog mobile data communication network works well by parceling total communication service area into a plurality of subarea according to a base station or a base station controller and by controlling the base station and the base station controller by a mobile switching center(MSC), the subscribers can keep their communication in moving from one subarea to another. However, the capacity of the analog mobile data communication system has a limited coverage for the continuously increased number of subscribers and the service area of the analog mobile data communication system is too small. Furthermore, since the analog mobile data communication system is analog type, the quality of conversation is not good and the effectiveness of frequency is not improved.

Therefore, in order to solve the problems of the analog mobile data communication system described above in detail, a digital mobile data communication system is developed. On the digital wireless mobile data communication networks, a communication service is requested to achieve the transmission of any kind of information at any time, in any area and to any destination, if the communication is only requested. In other words, the subscribers want the communication service on text, image and packet data information as well as the existing voice services being provided by digital wireless mobile data communication system. But, up to now, a data communication system which makes the data communication between mobile stations of the digital wireless mobile data communication network possible or a method for the data communication system has not yet been developed.

SUMMARY OF THE INVENTION

Accordingly, the present invention is directed to solve these problems of the conventional techniques and is to provide a CDMA mobile data communication system for a mobile-to-mobile data communication between mobile stations in which a mobile terminal and a data terminal in a CDMA mobile data communication network are linked to each other and a wireless data communication method using this system.

To achieve these and other advantages in accordance with the purpose of the present invention, as embodied and broadly described, the CDMA mobile data communication system and a wireless data communication method using this system according to the present invention include a plurality of mobile stations, a plurality of base stations and base station controllers which transfer the signal transmitted from said mobile stations within a predetermined service area and a signal transmitted to said mobile stations, a plurality of mobile switching centers which make a decision on the service options included in the signal transmitted from said base stations and said base station controllers and performs circuit data service or packet data service according to said decision, and at least one data network interworking unit which performs a call establishment between a calling party and a mobile station of the calling party when said mobile switching center provides a circuit data service and establishes a traffic channel of mobile data path.

More preferably, said data network interworking unit includes data path connection section which performs a path connection between said mobile switching centers and data network interworking units, a main processing section which forms a traffic channel of mobile data path between a calling party mobile station and a called party mobile station so that circuit data communication or a packet data communication is executed through said data path connection section, a circuit data processing section which analyzes the signal transmitted from said calling party mobile station and transmits said called party identification number(or subscriber number) to said main processing section if the protocol between the calling party mobile station and the called party mobile station is in its normal operation during the circuit data service of said main processing section, and a switching section which selectively switches the connection between said circuit data processing section and said data path connection section according to a control signal of said main processing section.

In order to achieve the purpose described above, the mobile data communication system according to the present invention in which at least one mobile switching center having a mobile connection control module, a mobile data path connection control module, a public switched telephone network data path connection control module and a trunk connection control module are connected to at least one data network interworking unit through a first and a second data path is characterized by including a step of receiving a called party mobile station identification number, a step of setting up a first traffic channel after setting up a first call from a calling party mobile station to said data network interworking unit, a step of calling a called party mobile station at said data network interworking unit, a step of establishing a second traffic channel after establishing a second call from said called party mobile station to said data network interworking unit when data response from said called party mobile station is received and informing said public switching telephone network(PSTN) data path connection control module of the first data path with a normal state by said mobile data path connection module, a step of establishing a call between said mobile switching center and the data network interworking unit through said second data path, and a step of connecting said first traffic channel to said second traffic channel through at least one modems.

In order to achieve another purpose of the present invention, the mobile data communication system according to the present invention in which at least one mobile switching centers having a mobile connection control module, a mobile data path connection control module, a public switched telephone network data path connection control module and a trunk connection control module are connected to at least one data network interworking units through a first and a second data paths is characterized by including a step of receiving a called party mobile station identification number, a step of establishing a first traffic channel after establishing a first call from a calling party mobile station to said data network interworking unit through a first mobile switching center, a step of calling a called party mobile station controlled by a second mobile switching center through said PSTN data path connection control module and said trunk connection control module from said data network interworking unit, a step of establishing a second traffic channel after establishing a second call from said called party mobile station to said data network interworking unit when data response from said called party mobile station is received and informing said public switched telephone network(PSTN) data path connection control module of the first data path with a normal state by said mobile data path connection module, a step of establishing a call between said PSTN data path connection control module and the data network interworking unit after informing said PSTN data path connection control module of a channel establishment completion by said mobile data path connection control module when said second traffic channel establishment is completed, a step of releasing the traffic channel established between said mobile connection control module and said PSTN data path connection control module when a call establishment between the PSTN data path connection control module and the data network interworking unit is completed, and a step of connecting said PSTN data path connection control module and the trunk connection control module.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
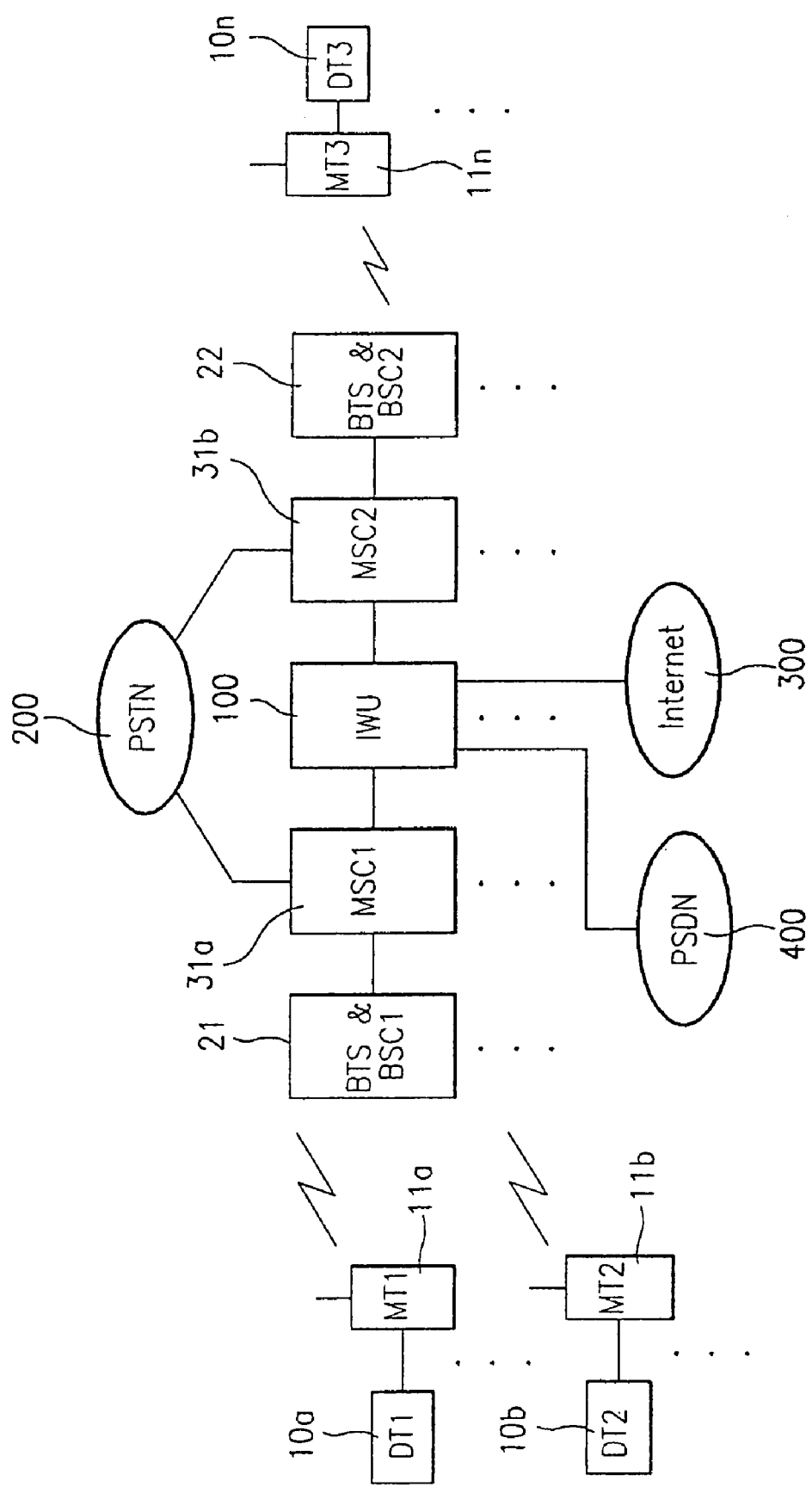
FIG. 1 is a block diagram showing the connection of CDMA mobile data communication network according to the present invention.

FIG. 1 is a block diagram showing the connection of CDMA mobile data communication network according to the present invention.

Referring to FIG. 1, the CDMA mobile data communication network includes mobile stations each of which consists of mobile terminal 11 and data terminal 10 (such as notebook, personal digital assistant, laptop, palmtop, portable computer, etc.) connected to each other according to a connection standard such as RS-232E, base station and base station controller 21 and 22 which are corresponding to a predetermined service area and controlling the mobile terminals 11a–11n located within said predetermined service area, mobile switching center 31a and 31b which changes a signal path according to a service option obtained by the analysis of signal transmitted from the base station and base station controller 21 and 22, and data network interworking unit 100 which establishes a call between a calling party and a called party and establishes a traffic channel of mobile data path when the mobile switching center 31a and 31b performs its circuit data service.

Hence, public switched telephone network(PSTN) 200 is connected with mobile switching center 31a and 31b, and Internet network 300 and/or public switched data network (PSDN) 400 are connected with data network interworking unit 100. Data network 100 and mobile switching centers 31a and 31b may be expanded in their capacity according to the number of subscribers.

Furthermore, in order to executing the wireless data communication system according to the present invention, each of said functional units of the CDMA mobile data communication network is required to have new functions. In other words, each mobile terminal 11 is required to have a protocol stack for circuit data, call processing module for the protocol stack, a call processing module for packet data processing and a wireless link protocol(RLP).

Each base station and base station controller 21 and 22 is required to have a function change of the frame of Vocoder and the RLP of Selector & Vocoder equipped in the base station. each base station and base station controller 21 and 22 and each mobile switching center 31a and 31b are also required to have a frame change function. Each mobile switching center 31a and 31b is required to have a function for analyzing the signal transmitted from the base station and base station controller 21 and 22 to obtain a service option and a switching function for switching the signal path according to the service option. Furthermore, since the data network interworking unit 100 according to the present invention has a modem, each mobile station is not required to have a modem when wireless data communication is performed between mobile stations.

Figure 2:
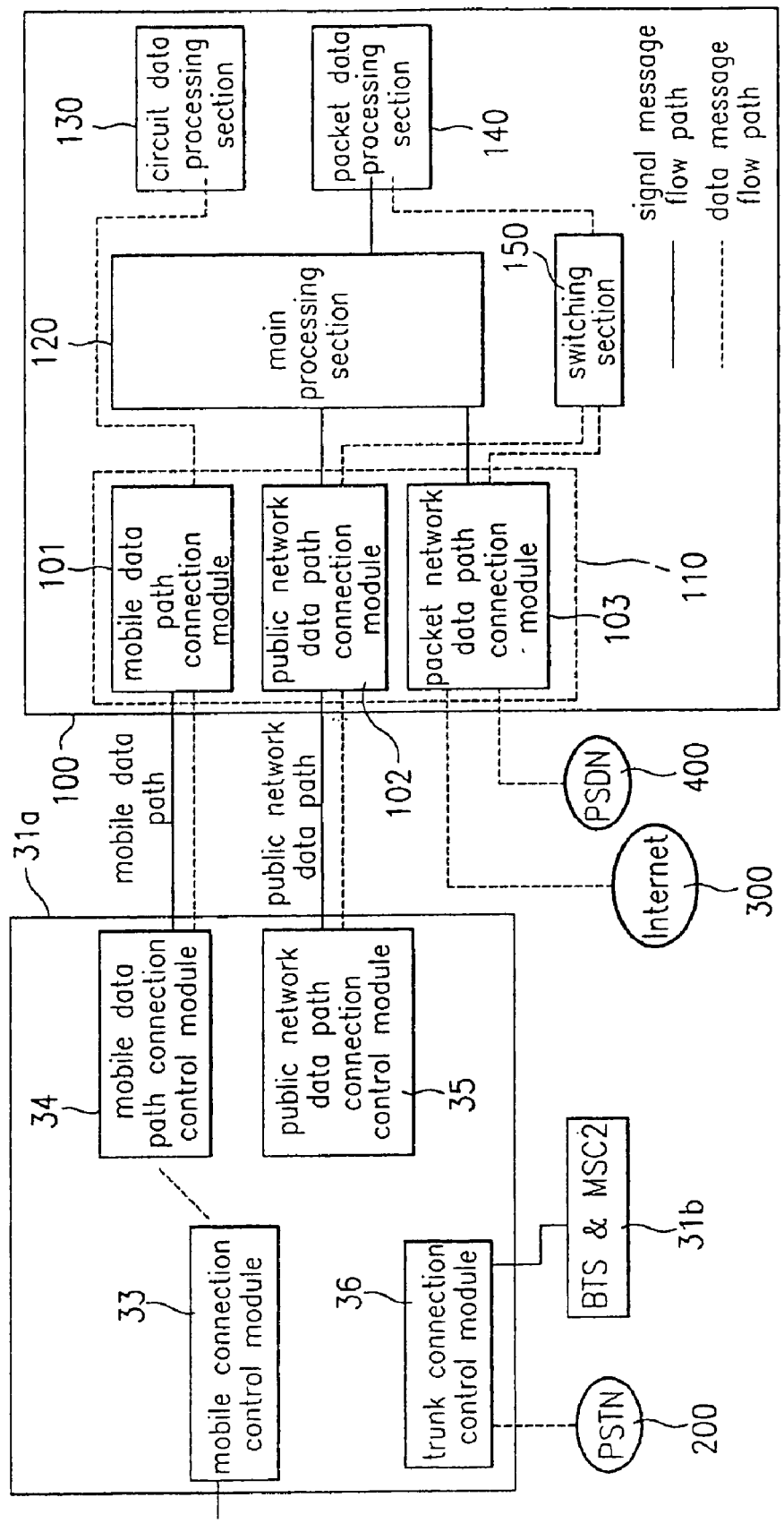
FIG. 2 is a block diagram of a data network interworking unit shown in FIG. 1.

Furthermore, mobile switching center 31a, as shown in FIG. 2, includes mobile connection control module 33 which generates a switching signal to switch the signal path by deciding a service option included in the signal transmitted from the base station and base station controller 21, mobile data path connection control module 34 which controls the connection of mobile data path according to the output signal of the mobile connection control module 33, public network data path connection control module 35 which controls the connection of PSTN data path according to the output signal of the mobile data network interworking unit 100, and trunk connection control module 36 which transmits the output signal of the public network or the mobile data path connection control module 34 and 35 to the PSTN 200 or other mobile switching center 31b according to the output signal of the mobile connection control module 33 or the public network data path connection control module 35.

The Mobile data network interworking unit 100, as shown in FIG. 2, data path connection section 110 which includes mobile data path connection module 101, public network data path connection module 102 and packet network data path connection module 103 and achieves the path connection between mobile switching center 31a and data network interworking unit 100, main processing section 120 which forms the traffic channel of mobile data path between a calling party mobile station and a called party mobile station so as to execute the circuit data communication or the packet data communication according to the signal received from the data path connection section 110, circuit data processing section 130 which transmits the called party identification number to the main processing section 120 by analyzing the signal transmitted from the calling party mobile station if the protocol between a calling party mobile station and a called party mobile station is executed in its normal operation when the main processing section 120 performs the circuit data service, packet data processing section 140 which transmits the called party identification number to the main processing section 120 by analyzing the signal transmitted from the calling party mobile station if the protocol between a calling party mobile station and a called party mobile station is executed in its normal operation when the main processing section 120 performs the packet data service, and switching section 150 which selectively switches the connection of the circuit data processing section 130 or packet data processing section 140 to mobile data path connection module 101, public network data path connection module 102 or packet network data path connection module 103 which are equipped in the data path connection section 110 according to the control signal of the main processing section 120.

The main processing section 120 includes mobile data path control module(MCHM) to establish a link between the main processing section 120 and mobile switching center 31a, circuit data control module(DBCM 1, 2) to control an exchange of the traffic data information between a mobile station and circuit data processing section(CDPA) 130, modem control module(DMCM 1, 2) to control a modem equipped in circuit data processing section(CDPA) 130, and public network data path control module(PCMM) to establish a link between mobile switching centers 31a.

Figure 3:
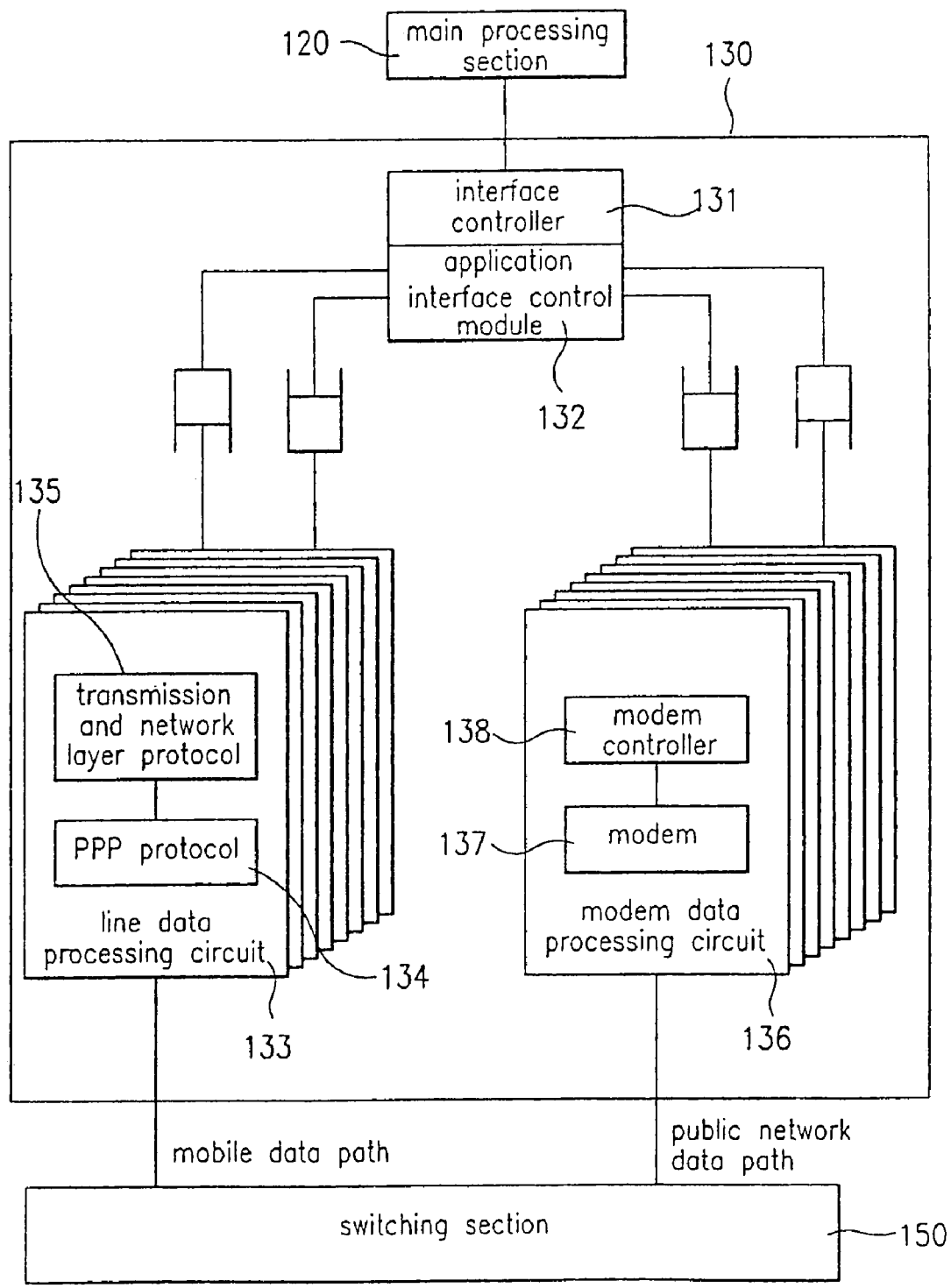
FIG. 3 is a block diagram of a circuit data processing section shown in FIG. 2.
Figure 4A:
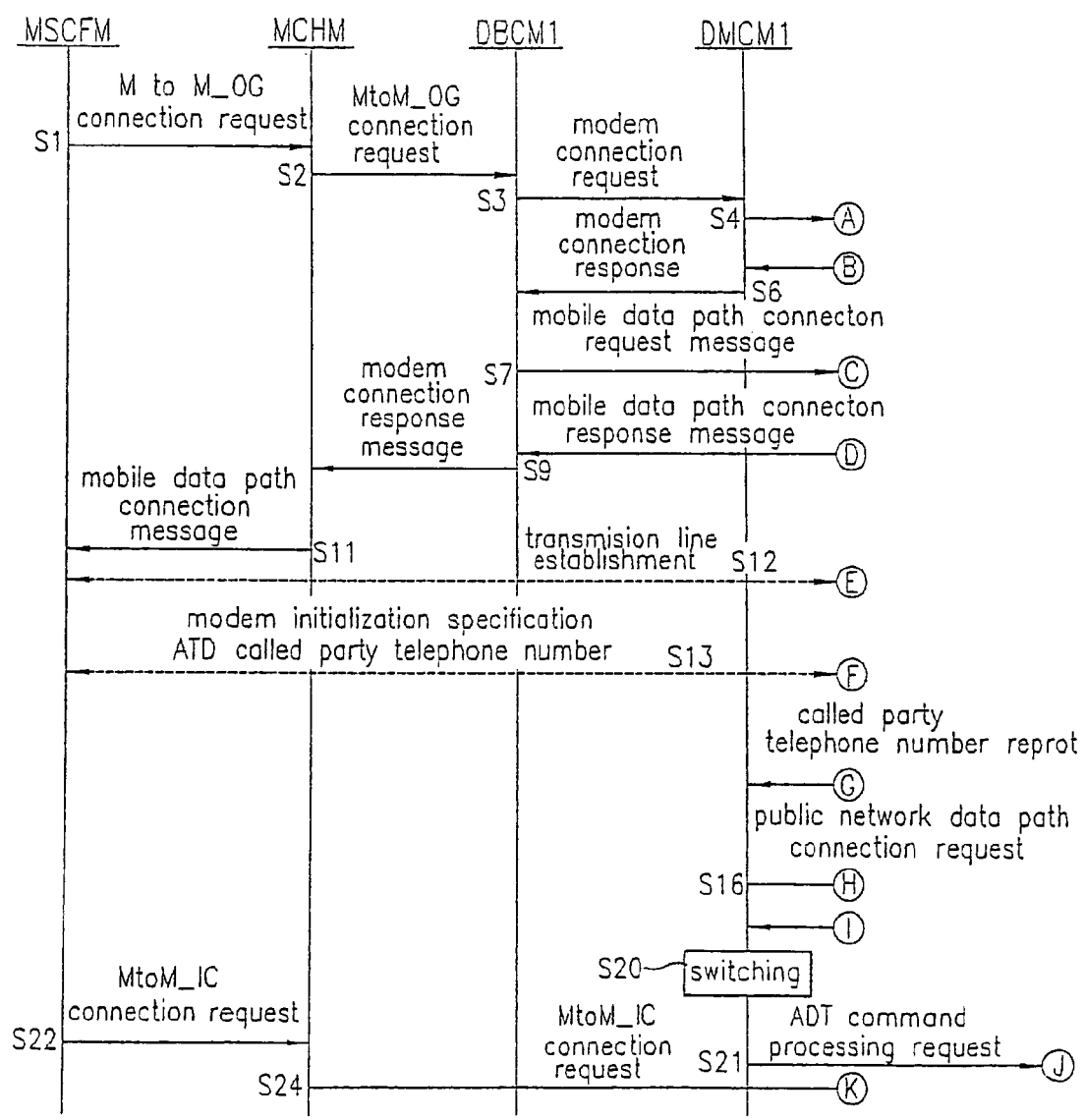
FIGS. 4A–4D show a signal flow graph for explaining the opening operation of a mobile data path when a wireless data communication between subscribes of the wireless data communication network according to the present invention is performed.
Figure 4B:
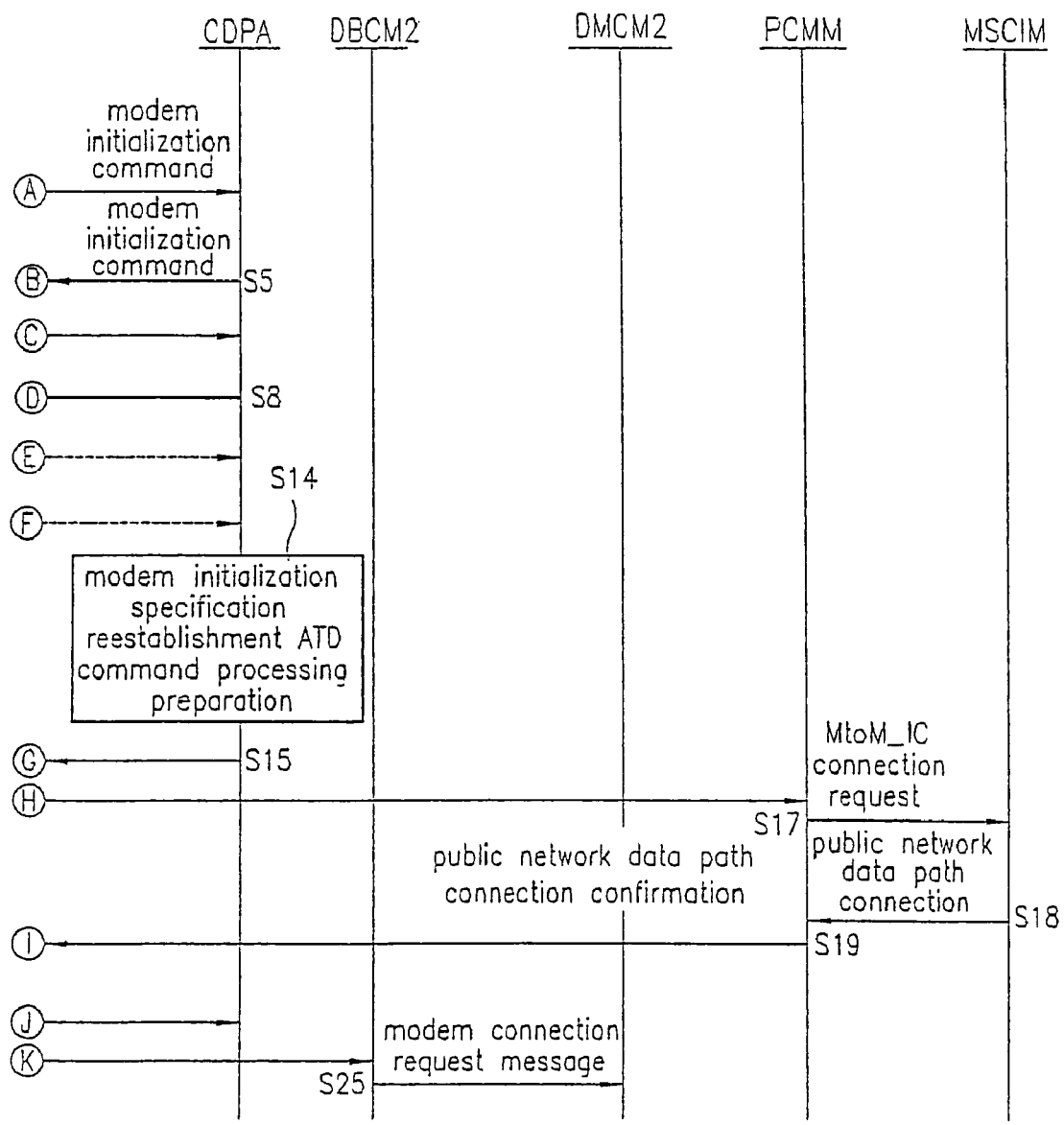
Figure 4C:
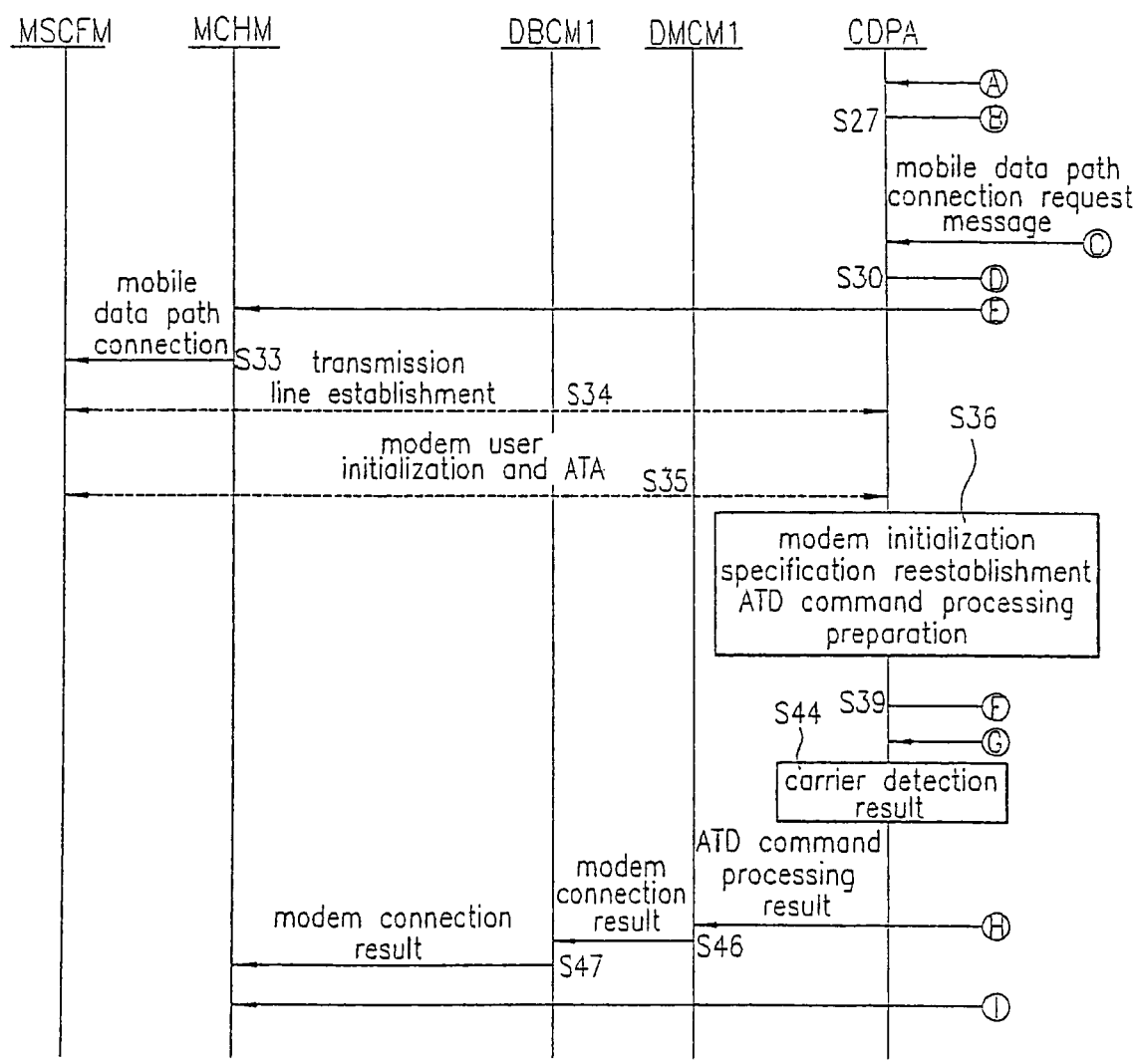
Figure 4D:
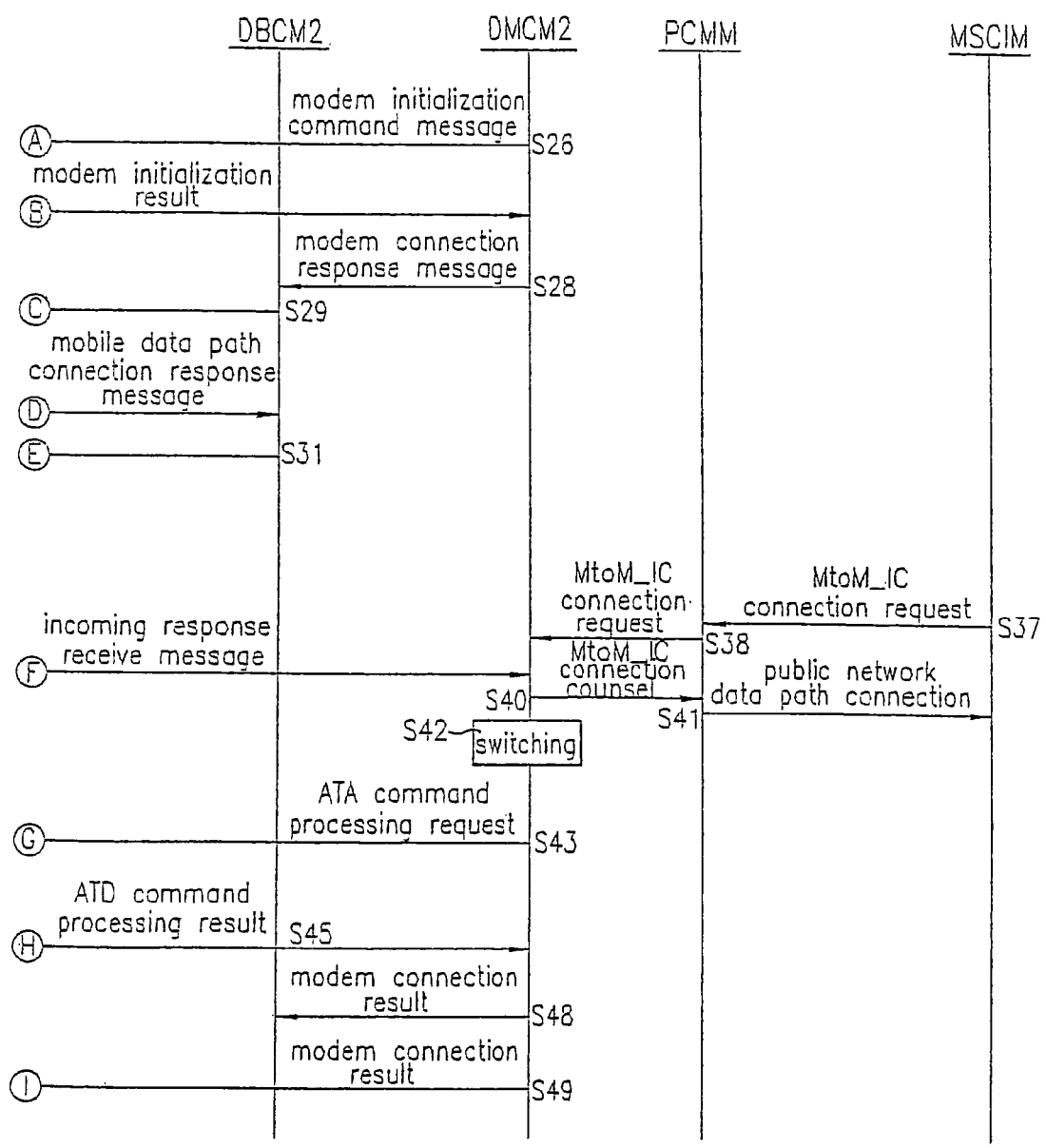
Figure 5A:
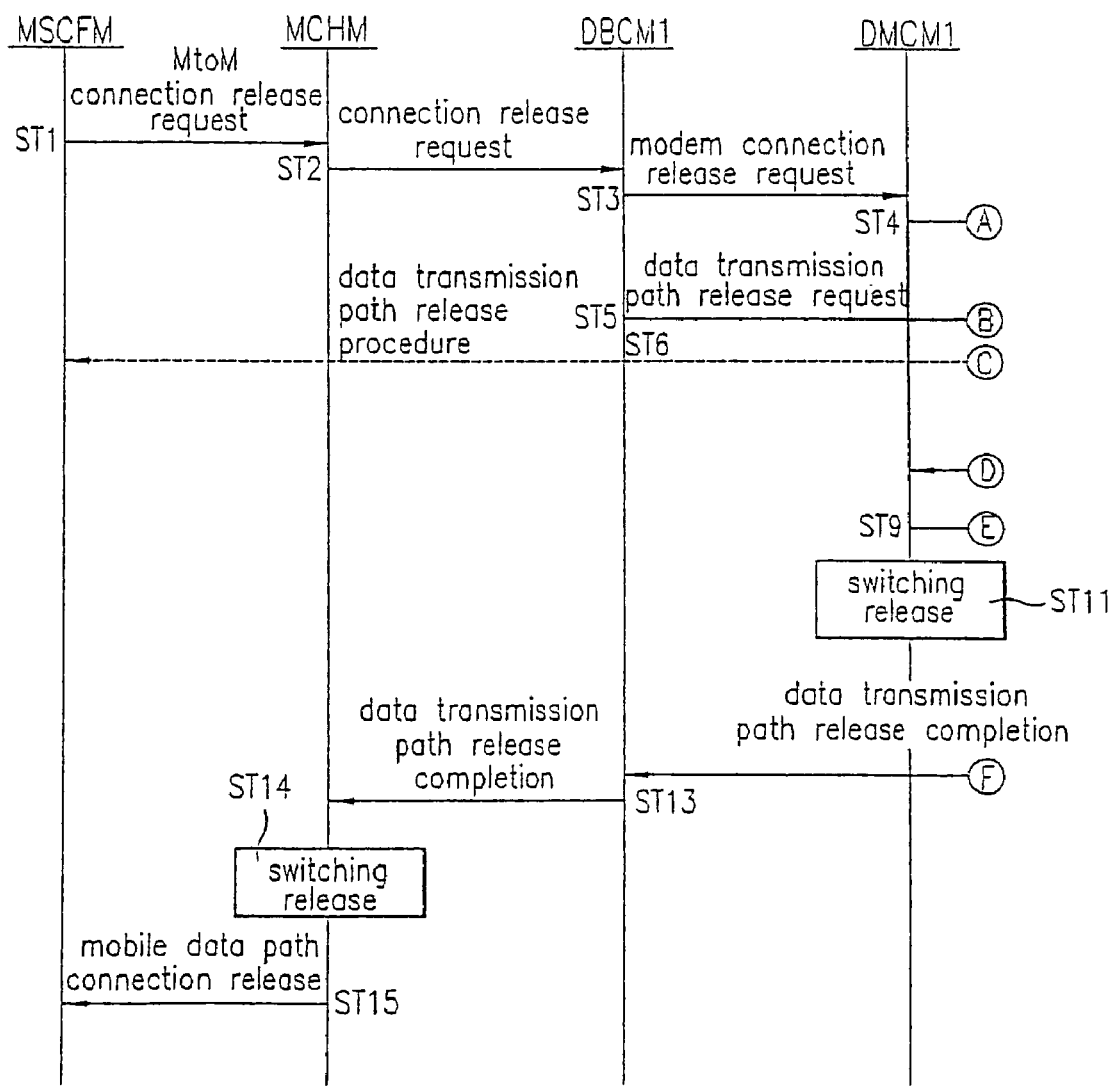
FIGS. 5A–5D show a signal flow graph for explaining the releasing operation of a mobile data path after a wireless data communication between subscribes of the mobile data communication network according to the present invention is performed.
Figure 5B:
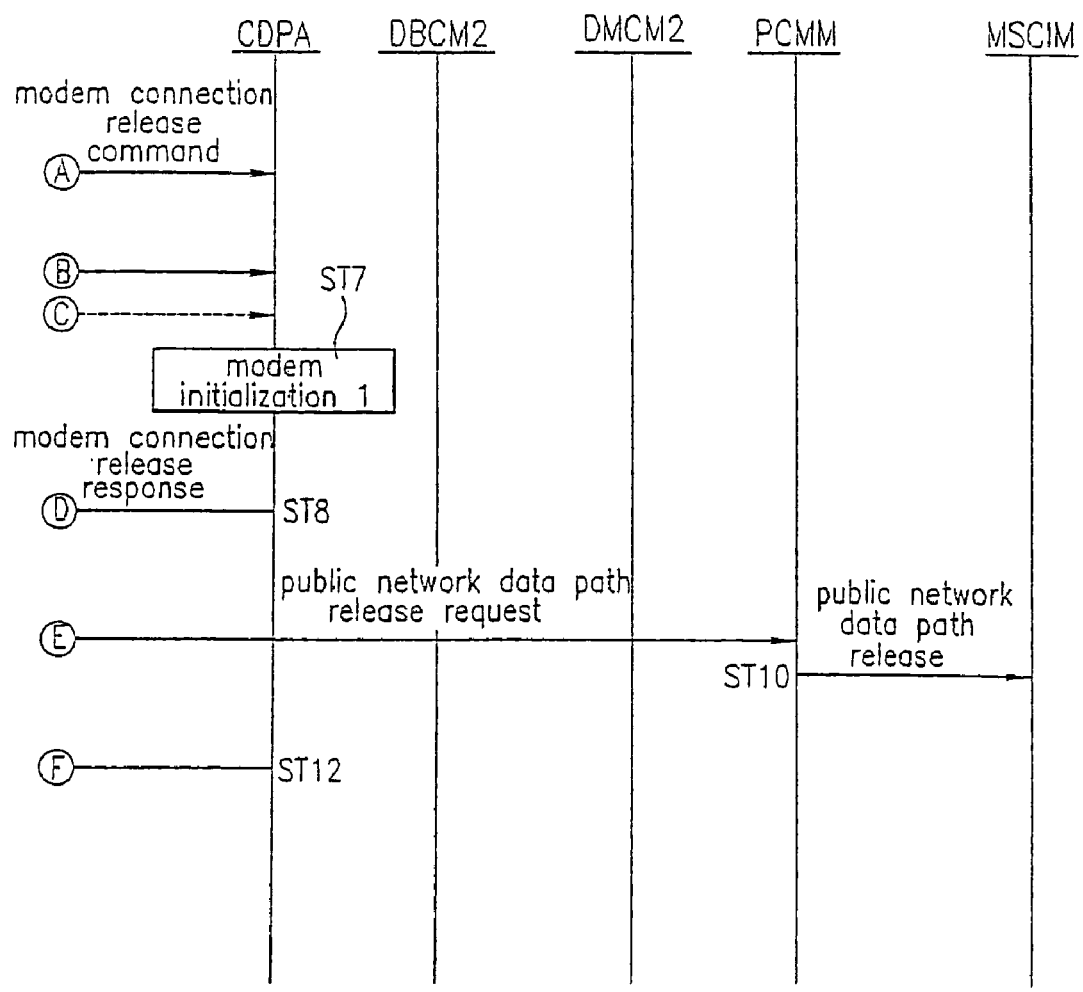
Figure 5C:
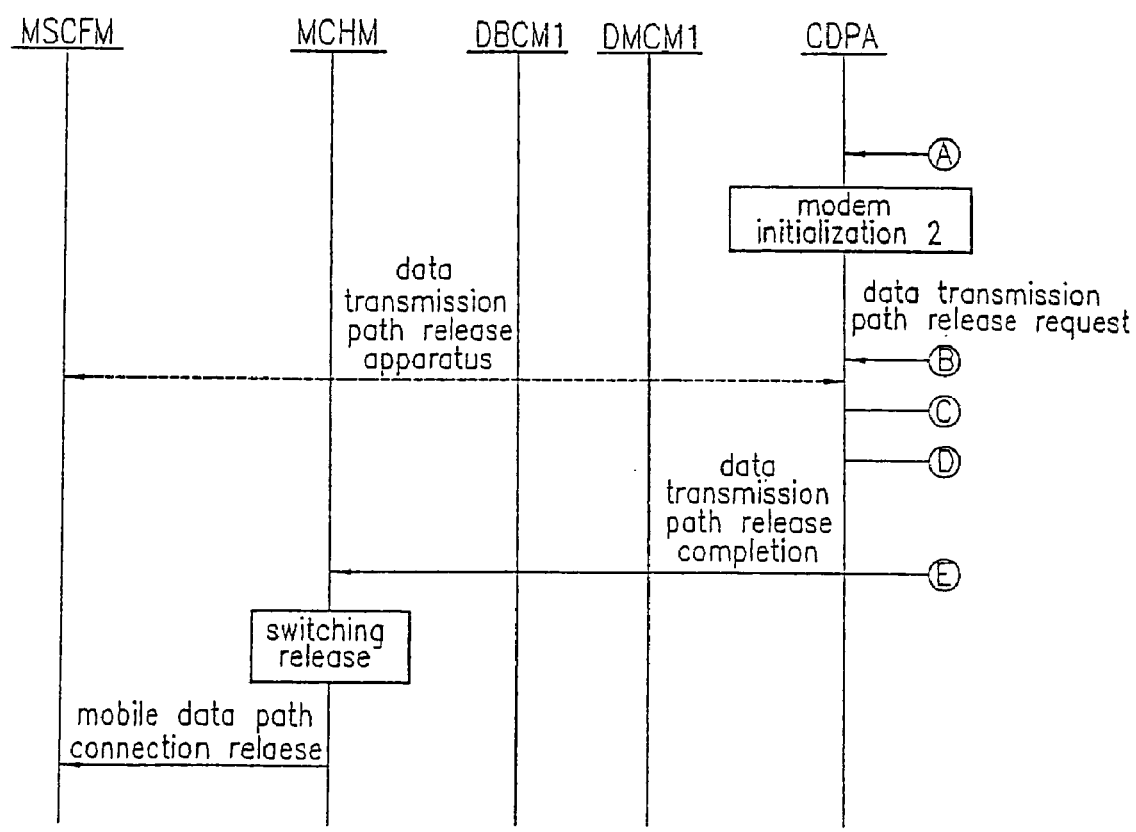
Figure 5D:
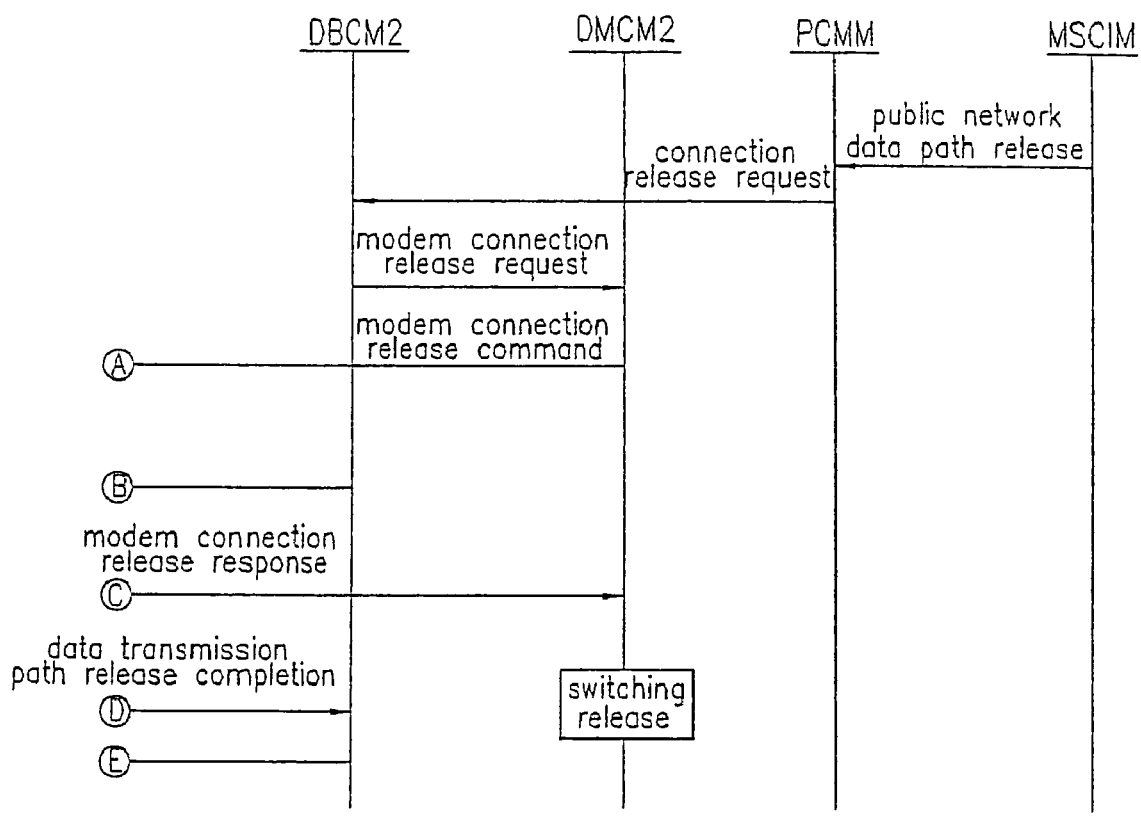
Figure 6:
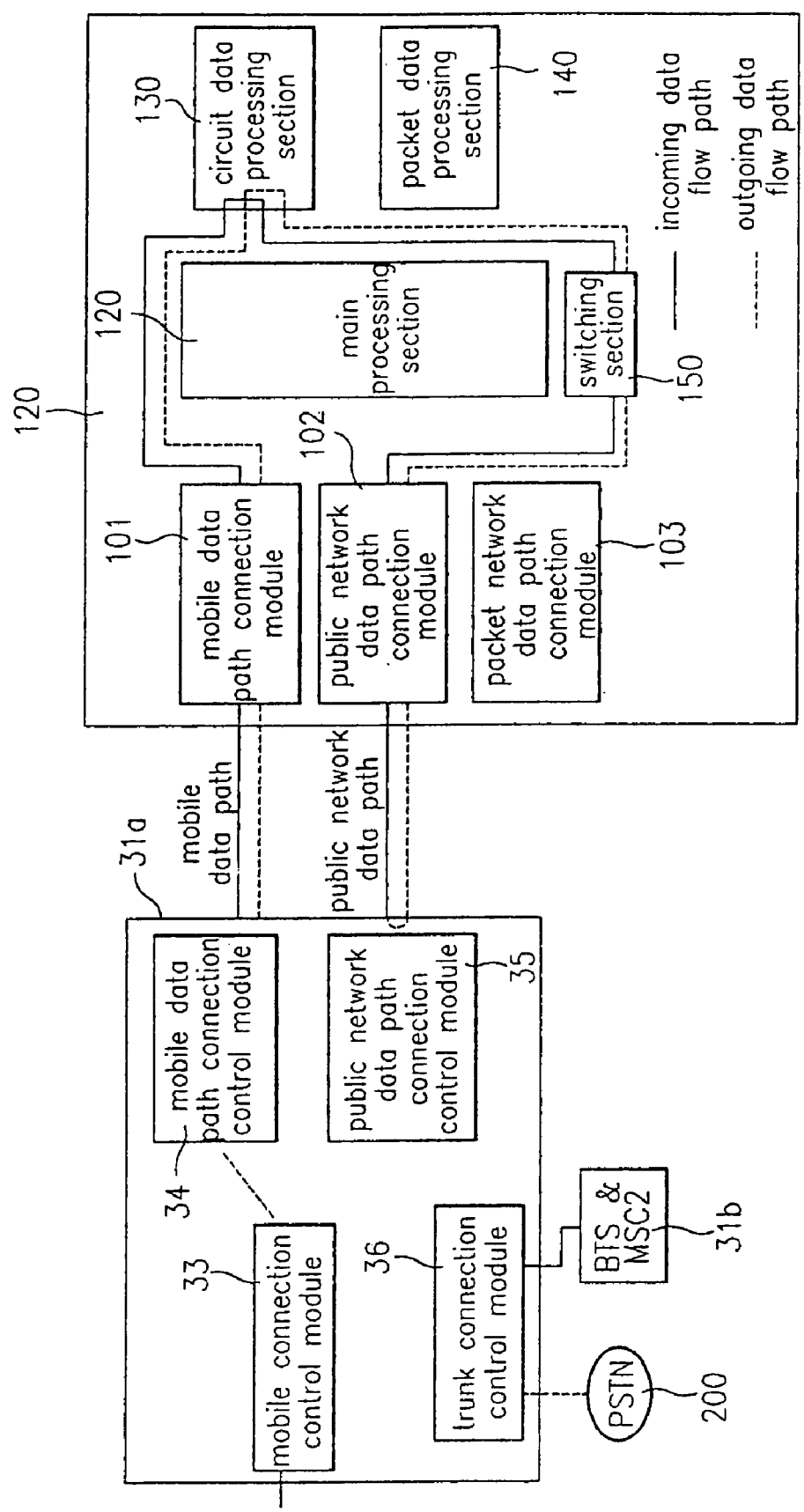
FIG. 6 shows the data flow according to the present invention on the block diagram of the data network interworking unit shown in FIG. 2.

The circuit data processing(CDPA) 130 of the mobile data network interworking unit 100 includes, as shown in FIG. 3, interface control section 131 for interfacing between the main processing section 120 and the circuit data processing section(CDPA) 130, a modem 137, and a modem controller equipped between the interface control section 131 and the modem 137 for controlling the modem 137 according to the output signal generated from the interface control section 131. The circuit data processing section(CDPA) 130 includes a circuit data processing circuit 133 for executing the protocol between the mobile terminal 11 and the mobile data network interworking unit 100.

One embodiment of wireless data communication method using the mobile data network interworking unit 100 according to the present invention is explained as follows by referring to the FIGS. 1 to 6.

In the explanation of the embodiment of the present invention, it is assumed that the data terminal 10a and the mobile terminal 11a in FIG. 1 are included in a calling party mobile station, the data terminal 10b and the mobile terminal 11b are included in a called party mobile station under control of the same mobile switching center 31a, and the data terminal 10n and the mobile terminal 11n are included in another called party mobile station where each of them is controlled by mobile switching section 31b different from each other.

First, establishing a mobile data path when the calling party mobile station and the called party mobile station are controlled by the same mobile switching center 31a is explained as follow.

When the calling party data terminal 10a and the mobile terminal 11a are connected to each other the calling party mobile terminal 11a automatically understands a circuit data service mode. In other words, when the calling party data terminal 10a and the mobile terminal 11a are connected to each other, AT command such as AT+CRM=0 is automatically executed and the mobile terminal 11a understands its circuit data service execution. Generally, if AT+CRM=1 a Generic PPP Internet service mode is established and if AT+CRM=2 a cellular digital packet data service mode is established. Therefore, when a calling party mobile station user wants to send wireless data to an arbitrary called party mobile station subscriber the user inputs ATD called party telephone number by using the calling party data terminal 10a. Then, the signal generated from the mobile terminal 10a is transmitted to the mobile switching center 31a through the corresponding base station and base station controller 21.

The mobile connection control module 33 of the mobile switching center 31a confirms the service option included in the signal transmitted from the base station and base station controller 21. The service option, for example it is defined as SO4,5,7,12,13,15, is that in this embodiment SO4,12 represents a asynchronous data, SO5,13 represents a fax data, and SO7,15 represents a generic PPP packet data. Thus, when the service option included in the signal transmitted from the base station and base station controller is SO4 or 12, the mobile connection control module 33 of the mobile switching center 31a understands the service option as an asynchronous data service mode and therefore, as shown in FIG. 2, switches the signal path to mobile data path connection control module(MSCFM) 34 of the mobile switching center 31a. Then, the mobile data path connection control module(MSCFM) 34 of the mobile switching center 31a requires the call establishment from the mobile data path connection module 101 of the data network interworking unit 100 (S1). The mobile data path connection module 101 of the mobile data network interworking unit 100 informs the mobile data path control module (MCHM) in the main processing section 120 of this call establishment. Then, the mobile data path control module(MCHM) of the main processing section 120 transmits mobile-to-mobile outgoing connection request message to the circuit data control module(DBCM1) in the main processing section 120 (S2). The circuit data control module(DBCM1) assigns an idle modem resource to a mobile data path and transmits the modem connection request message to the modem control module (DMCM1) in the main processing section 120 (S3). Then, the modem control module (DMCM1) transmits a modem initialization command message to the circuit data processing section (CDPA) 130 of the mobile data network interworking unit 100 (S4). The interface controller 131 of the circuit data processing section (CDPA) 130 receives the modem initialization command message and informs the modem controller 138 of the modem data processing circuit 136 of the message.

The modem controller 138 confirms if an idle modem exists by communicating with modem 137 and controls basic specification value of the modem 137 to be established. The interface controller 131 of the circuit data processing section (CDPA) 130 transmits the modem initialization result message including a decision whether the result of the modem initialization process is right or wrong and its cause to the modem control module (DMCM1) (S5). The modem control module (DMCM1) transmits a modem connection response message to the circuit data control module(DBCM1) (S6).

When the modem 137 in the circuit data processing section (CDPA) 130 is successfully initialized, the circuit data control module (DBCM1) transmits the mobile data path connection request message to the circuit data processing section (CDPA)130 (S7) and receives, as its response, the mobile data path connection response message from the circuit data processing section (CDPA) 130 (S8). After then, the circuit data control module (DBCM1) transmits the modem connection response message to the mobile data path control module(MCHM) (S9). The mobile data path control module (MCHM) which receives the response message transmits the mobile data path connection request message to the mobile data path connection control module (MSCFM) 34 of the mobile switching center 31a (S11). Therefore, a transmission layer protocol and a point-to-point link protocol network between the calling party mobile terminal 11a and the modem 137 of the circuit data processing section (CDPA) 130 are formed. Thus, a traffic channel between the calling party data terminal 10a the inter-network connection unit 50 is achieved.

The mobile terminal 11a stores the modem initialization specification previously established at the data terminal 10a and the called party telephone number called by a calling party mobile station and transmits the stored to the modem 137 through the traffic channel of the data network interworking unit 100 and the calling party mobile terminal 11a when the path to a protocol transmission layer of the circuit data processing circuit 133 in the circuit data processing section 130 is formed (S13). The application interface layer of the circuit data processing circuit 133 of the circuit data processing section (CDPA) 130 analyzes the modem initialization specification requested by the calling party mobile station and the ATD called party telephone number and reestablishes a modem initialization specification which is required by the calling party mobile station to the previously assigned modem 137 and then makes preparation for ATD command processing (S14). After then, the application interface layer transmits the called party telephone number received together with the modem command of the calling party mobile station to the modem control module (DMCM1) (S15).

The modem control module (DMCM1) transmits the public network data path connection request message to the public network data path control module (PCMM) equipped in the main processing section 120 (S16) The public network data path control module (PCMM) makes mobile-to-mobile incoming connection request to the public network data path connection control module (MSCIM) 35 in the mobile switching center 31a (S17).

The public network data path connection control module (MSCIM) 35 of the mobile switching center 31a which receives the connection request controls a signal path switching to the mobile connection control module 33 and transmits the incoming connection request message to the called party mobile terminal 11b through the base station and base station controller 21. If the called party mobile station user wants the circuit data communication when the called party data terminal 10b and the mobile terminal 11b are connected to each other, the user inputs a modem response command such as ATA by using the called party data terminal 10b. Then, the mobile terminal 10b transmits the incoming signal to the mobile switching center 31a through the corresponding base station and base station controller 21.

After then, the mobile connection control module 33 of the mobile switching center 31a confirms the service option included in the signal from the called party mobile station in the same method previously described. When the called party mobile station is established in the circuit data service mode, the mobile connection control module 33 of the mobile switching center 31a establishes a traffic channel to the mobile data path in the same way as the call outgoing case by using the mobile data path connection control module 34. When the called party mobile data path is normally established the mobile data path connection control module controls the signal path switching to the public network data path connection control module (MSCIM) 35. Then the public network data path connection control module (MSCIM) 35 transmits the public network data path connection message to the public network data path control module (PCHM) of the main processing section 120 (S18). The public network data path control module (PCHM) transmits the public network data path confirmation message to the modem control module (DMCM1) (S19). The modem control module (DMCM1) asks the circuit data processing section (CDPA) 130 to process the ATD command (S21). Then, the mobile data path connection control module (MSCFM) 34 transmits the modem connection request message to the mobile data path control module (MCHM) of the main processing section 120 (S21). The mobile data path control module (MCHM) transmits the modem connection request message to the circuit data control module (DBCM2) of the main processing section 120 (S24). Then, the circuit data control module (DBCM2) assigns idle modem resource and transmits the modem connection request message to the modem control module (DMCM2) (S25). The modem control module (DMCM2) transmits the modem initialization command message to the circuit data processing section (CDPA) 130 of the mobile data network interworking unit 100 (S26). The circuit data processing unit (CDPA) 130 which receives the command message confirms idle modem resource and then establishes the basic specification value to the modem. The circuit data processing section (CDPA) 130 provides the modem control module (DMCM2) of the main processing section 120 with the modem initialization result message which includes the decision whether the result of processing is right or wrong and its cause (S27). The modem control module (DMCM2) provides the circuit data control module (DBCM2) with the modem connection response message (S28).

When the initialization of the modem 137 of the circuit data processing section 130 is successfully done, the circuit data control module (DBCM2) transmits the mobile data path connection request message to the circuit data processing section (CDPA) 130 and receives the mobile data path connection response message from the circuit data processing section (CDPA)130 (S30). The circuit data control module (DBCM2) which receives the response message transmits the modem connection response message to the mobile data path connection module (MCHM) of the main processing section 120 (S31). The mobile data path connection module (MCHM) which receives this message forms a mobile data path between the modem 137 and the called party mobile terminal 11*b* and provides a port of modem 137 equipped in the circuit data processing section (CDPA) 130 by using one of data link connection identifier values (DLCI) which is controlled by a selected channel. After then, the point-to-point link protocol between the mobile terminal 11*b* and the circuit data processing section (CDPA) 130 and the network and transmission protocol are performed and a transmission path is formed (S34). Therefore, the traffic channel of the mobile data between the called party mobile terminal 11*b* and the modem 130 is formed.

The called party mobile terminal 11*b* stores a modem initialization specification previously established in the data terminal 10*b* and the modem response command provided from the called party mobile station and transmits the stored information to the modem port of the assigned circuit data processing section (CDPA) 130 when the transmission layer is opened (S35). When the modem initialization specification and the modem response command are received, the application interface layer of the circuit data processing section (CDPA) 130 analyzes them, reestablishes the modem initialization specification which is required by the calling party mobile station to a previously assigned modem 137 and provides the modem control module (DMCM2) with the incoming response receive message. During executing the point-to-point protocol, the public network data path connection request message of the public network data path connection control module (MSCIM) 35 of the mobile switching center 31*a* is provided to the public network data path connection module 102 (S37). The public network data path connection module 102 informs the modem control module (DMCM2) of the public network data path connection request message. The circuit data processing section (CDPA) 130 provides the modem control module (DMCM2) with an incoming response receive message (S39). Then, the modem control module (DMCM2) transmits the modem connection request message to the public network data path control module (PCMM) (S40). The public network data path control module (PCMM) transmits the connection message of the public network data path to the public network data path connection control module (MSCIM) 35 (S41). When the public network data path connection request message and the incoming response message are received, the modem control module (DMCM2) transmits a switching control signal to the switching section 150, switches the public network data path connection module and the previously assigned modem 137 (S42) and requests the modem 137 of the circuit data processing section (CDPA) 130 to execute ATD command (S43).

When the public network data path connection of the called party mobile station is previously completed, the public network data path connection message is transmitted to the public network data path control module (PCMM) through the public network data path connection control module (PCHM). The public network data path control module (PCMM) which received the connection message provides the modem control module (DMCM1) with the public network data path connection confirmation message. The modem control module (DMCM1) which receives the confirmation message sends a control signal to the switching section 150 so as to switch the traffic channel of the public network data path and the port of the previously assigned modem 137 and requests the circuit data processing section (CDPA) 130 to execute the ATD command (S43). Then, after transmitting the ATD command to the corresponding modem data processing circuit 136 of the circuit data processing section (CDPA) 130, the modem data processing circuit 136 is ready to detect a carrier for a while. If a carrier is received (S44) or a fixed time passes, a modem connection result message is transmitted to the modem control module (DMCM1) (S45). In this time, the result message includes the information whether the carrier is detected or not. The modem control module (DMCM1) which received the result message transmits a modem-to-modem connection confirmation message which indicates the connection between modems of the calling party mobile station and the called party mobile station to the circuit data control module (DBCM1) (S46). This circuit data control module (DBCM1) transmits the modem-to-modem connection message to the mobile data path connection module (MCHM1) (S47). This process is the same as the case of the called party mobile station, but the ATA command processing request in the called party instead of the ATD command processing request in the calling party is transmitted.

Particularly, the public network data path connection control module (MSCIM) 35 of the mobile switching center 31*a* does switch the mobile stations of the calling party and the called party. Generally, it is called an anchor point. By this procedure described above, the circuit data communication between mobile stations subscribed at the mobile data communication network is achieved.

Hereafter, the opening of a wireless data path in the case that a calling party mobile station 10*a* and 11*a* and a called party mobile station 10*n* and 11*n* are not under the control of the same mobile switching center 31*b* is explained. For the most part of this case, its operation is almost the same as the case of one mobile switching center. Therefore, the differences between them is explained.

The step which inputs the identification of the called party mobile station by the ATD command and the step which establishes a first call from the calling party mobile station to the data network interworking unit through a first mobile switching center and establishes the first traffic channel are the same as the case of one mobile switching center.

However, the mobile data network interworking unit 100, through the public network data path connection control module 34 and the trunk connection control module 36 of the mobile switching center 31*a*, calls a called party mobile station 10*n* and 11*n* of another mobile switching center 31*b*. When a data response is automatically provided by the ATA command or a preset automatic response mode from the called party mobile station 10*n* and 11*n*, the call establishment from the called party mobile station 10*n* and 11*n* to the mobile data network interworking unit 100 is done and the mobile data path connection control module 34 informs the public data path connection control module 35 of the normal state of the mobile data path and establishes a traffic channel.

When the traffic channel is completely established, the mobile data path connection control module 34 informs the public network data path connection control module 35 of the channel establishment completion and establishes the call between the public network data path connection control module 35 and the mobile data network interworking unit 100.

When the call establishment between the public network data path connection control module 35 and the data network interworking unit 100 is completed, the traffic channel between the mobile connection control module 34 and the public network data path connection control module 35 is released and then the public network data path connection control module 35 and the trunk connection control module 36 are connected to each other. Therefore, a circuit data communication between mobile stations subscribed to the mobile data communication network is achieved.

Hereafter, the procedure closing the mobile circuit data communication or releasing the resources for the preset mobile data path or the network data path is explained.

When a connection release request message is inputted from a calling party mobile station or a called party mobile station or the public network data path release request is transmitted from the public network data path control module (PCMM) to the modem control module (DMCM2), the resources are released.

In the embodiment of the present invention, a case in which a connection release request message is inputted from a calling party mobile station is explained by referring to FIG. 5. FIG. 5 is a signal processing flow graph of the procedure releasing the mobile data path after performing the wireless data communication between subscribers to the mobile data communication network according to the present invention.

Referring to FIG. 5, when a connection release command is inputted from a calling party data terminal 10*a*, the signal is transmitted to a mobile terminal 11*a*, transformed into a wireless signal and transmitted to a mobile switching center 31*a* by a corresponding base station and base station controller 21. When the mobile data path connection module (MSCFM) 34 of the mobile switching center 31*a* is decided to be in a connection release mode by the base station and base station controller 21, a mobile-to-mobile connection release request message is transmitted to a mobile data network interworking unit 100 (ST1). In the main processing section 120 of the mobile data network interworking unit 100, the mobile data path connection module (MCHM) provides the circuit data control module (DBCM1) with connection release request message (ST2). The circuit data control module (DBCM1) provides modem control module (DMCM1) with a modem connection release request message (ST3) and at the same time provides a circuit data processing section (CDPA) 130 with a mobile data transmission path release request message (ST5). The modem control module (DMCM1) transmits the modem connection release command message to the circuit data processing section (CDPA) 130 (ST4). The circuit data processing section (CDPA) 130 which receives the message initializes a used modem (ST7) and executes the data transmission path release procedure (ST6). The circuit data processing section (CDPA) 130 provides the modem control module (DMCM1) and the circuit data control module (DBCM1) with the modem connection release response message and the data transmission path release completion message, respectively (ST8). Then, if the modem control module (DMCM1) receives the modem connection release response message, a switching control signal is applied to the switching section 150 (ST11) and a public network data path release request message is transmitted to the public network data path control module (PCMM) of the main processing section 120 (ST9). Then, the circuit data control module (DBCM1) provides the mobile data path control module (MCHM) with data transmission path release completion message (ST12). The mobile data path control module (MCHM) which receives this message transmits the mobile data path connection release to the mobile data path connection control module (MSCFM) 34 equipped in the mobile switching center 31*a* (ST15) and releases a switching connected between a port of a preassigned modem 137 and the traffic channel of the mobile data path (ST14).

According to the embodiment of the present invention described above, in the mobile data communication network of a CDMA system, a mobile multimedia communication service transmitting and receiving data such as text, image, packet data, etc. in wireless channel is possible between the calling party mobile station and the called party mobile station both of which have a mobile terminal and a data terminal connected to each other. The data communication between a mobile station of a mobile data communication network and a fixed station connected to a public switched telephone network is possible.

It will be apparent to those skilled in the art that various modifications and variations can be made in the CDMA mobile data communication system and the wireless data communication method of the present invention without departing from the spirit or scope of the invention. Thus, it is intended that the present invention covers the modifications and variations of this invention provided they come within the scope of the appended claims and their equivalents.

What is claimed is:

1. A mobile data communication system for a wireless data communication, comprising:
   a plurality of mobile stations;
   a plurality of base stations and base station controllers for transferring a signal transmitted from said mobile stations and a signal transmitted to said mobile stations in a predetermined service area;
   a mobile switching center for detecting a service option included in the signal transmitted from the base stations and base station controllers and for switching between a circuit data service and a packet data service based on the detected service option; and
   at least one mobile data network interworking unit for establishing a traffic channel of a mobile data path and a call between a calling party mobile station and a called party mobile station when said mobile switching center performs the circuit data service, wherein first and second data paths are established between the mobile switching center and the least one mobile data network interworking unit.

2. The mobile data communication system claimed in claim 1, wherein said mobile switching center comprises:
   a mobile connection control module for detecting the service option included in the signal transmitted from said base station and base station controllers and for generating a switching signal controlling an interface connection;
   a mobile data path connection control module for controlling the connection to a mobile network data path according to the switching signal of said mobile connection control module;

a public network data path connection control module for controlling the connection to a public network data path according to the output signal of said mobile data network interworking unit; and a trunk connection control module for transmitting an output signal of said public network data path connection control module or said mobile network data path connection control module to a public switched telephone network or to a second mobile switching center according to the switching signal of said mobile data path control module or said public network data path connection control module.

3. The mobile data communication system claimed in claim 1, wherein said mobile station comprises a data terminal coupled to a mobile terminal.

4. The mobile data communication system claimed in claim 3, wherein said data terminal comprises one of notebook computer, personal digital assistant, laptop computer, palmtop computer, portable and small computer.

5. The mobile data communication system claimed in claim 1, wherein each of said mobile stations comprises a protocol stack for circuit data and a call processing module for processing packet data.

6. The mobile data communication system claimed in claim 1, wherein said mobile data network interworking unit comprises:
   a data path connection section for forming a path connection between said mobile switching center and mobile data network interworking unit;
   a main processing section forming a traffic channel of a mobile data path between the calling party mobile station and the called party mobile station to execute a circuit data communication or a packet data communication according to a received signal from said data path connection section;
   a circuit data processing section analyzing the signal transmitted from said calling party mobile station if the protocol between the calling party mobile station and the called party mobile station is normally executed when said main processing section performs the circuit data service and then transmitting a called party identification number to said main processing section; and
   a switching section selectively switching the connection between said circuit data processing section and said data path connection section according to the control signal of said main processing section.

7. The mobile data communication system claimed in claim 6, wherein said main processing section comprises:
   a mobile data path control module for establishing a link with said mobile switching center;
   a circuit data control module controlling the exchange of traffic data information between said mobile station and circuit data processing section;
   a modem control module controlling a modem equipped in said circuit data processing section; and
   a public network data path control module for establishing the link with said mobile switching center.

8. The mobile data communication system claimed in claim 6, wherein said circuit data processing section comprises:
   an interface control section performing an interface between said main processing section and said circuit data processing section;
   at least one modem; and
   a modem controller controlling an operation of the at least one modem according to a modem control signal of said interface control section.

9. The mobile data communication system claimed in claim 6, wherein the data terminal and the mobile terminal are integrated to form a single device.

10. The mobile data communication system claimed in claim 1, wherein said mobile data communication system comprises a CDMA mobile data communication system.

11. The system of claim 1, wherein the at least one mobile data network interworking unit comprises a module for providing circuit service and a module for providing packet based service, and wherein different protocol stacks are used for packet service and circuit service.

12. The system of claim 11, wherein the at least one mobile data network interworking unit comprises at least one module for connecting a first protocol to a second protocol for interface with the interworking function.

13. The method of claim 1, wherein the first data path is a mobile data path and the second data path is a public network data path.

14. A wireless data communication method in which at least one mobile switching center including a mobile connection control module, a mobile data path connection control module, a public network data path connection control module and a trunk connection control module are connected with at least one data network interworking unit by a first data path and a second data path, comprising:
   inputting an identification number of a called party mobile station;
   establishing a first call from a calling party mobile station to a mobile data network interworking unit and then establishing a first traffic channel;
   calling the called party mobile station at the mobile data network interworking unit;
   establishing a second call from said called party mobile station to the mobile data network interworking unit when a data response comes from said called party mobile station and then establishing a second traffic channel after the mobile data path connection module informs the public network data path connection control module of a normal state of a first data path between a mobile switching center and the mobile data network interworking unit;
   establishing a call between the mobile switching center and the mobile data network interworking unit through a second data path; and
   connecting said first and second traffic channels through at least one modem of the interworking unit to perform circuit data service, wherein the identification number of said called party mobile station is inputted by an ATD command and the data response is automatically generated by a present automatic response or ATA command.

15. The wireless data communication method claimed in claim 14, wherein said first data path is a mobile data path and said second data path is a public network data path.

16. The wireless data communication method claimed in claim 14, wherein establishing the first call comprises:
   deciding a service option included in the signal transmitted from said calling party mobile station; and
   requesting said data network interworking unit to establish a call when said service option is to request a circuit data communication service.

17. The wireless data communication method claimed in claim 14, wherein establishing the first traffic channel comprises:
   initializing a first modem equipped in the data network interworking unit;

connecting a path between said calling party mobile station and the data network interworking unit to modem;

establishing a communication protocol between said calling party mobile station and the data networking unit;

transmitting the identification number of said calling party mobile station and said modem initialization specification from said calling party mobile station to the first modem; and reestablishing with a modem initialization specification required by said calling party mobile station.

18. The wireless data communication method claimed in claim 17, wherein initializing the first modem comprises:

deciding whether or not there is an idle resource in the first modem; and establishing a basic configuration value when there is an idle resource in the first modem.

19. The wireless data communication method claimed in claim 14, wherein calling the called party mobile station comprises:

transmitting a connection request message from the mobile data network interworking unit to said mobile switching center;

requesting an incoming connection from said mobile station to said called party mobile station; and calling a mobile terminal of said called party mobile station.

20. The wireless data communication method claimed in claim 14, wherein establishing said second call comprises:

detecting a service option included in the signal transmitted from said called party mobile station; and requesting the data network interworking unit to establish a call when said detected service option is for a circuit data communication service.

21. A wireless data communication method in which at least one mobile switching center including a mobile connection control module, a mobile data path connection control module, a public network data path connection control module and a trunk connection control module are connected with at least one data network interworking unit by a first data path and a second data path, comprising:

inputting an identification number of a called party mobile station;

establishing a first call from a calling party mobile station to a mobile data network interworking unit and then establishing a first traffic channel;

calling the called party mobile station at the mobile data network interworking unit;

establishing a second call from said called party mobile station to the mobile data network interworking unit when a data response comes from said called party mobile station and then establishing a second traffic channel after the mobile data path connection module informs the public network data path connection control module of a normal state of a first data path between a mobile switching center and the mobile data network interworking unit;

establishing a call between the mobile switching center and the mobile data network interworking unit through a second data path; and connecting said first and second traffic channels through at least one modem of the interworking unit to perform circuit data service, wherein establishing said second traffic channel comprises:

initializing a second modem equipped in the data network interworking unit;

connecting a path between said called party mobile station and the data network interworking unit to modem;

establishing a communication protocol between said called party mobile station and the data network interworking unit;

transmitting said incoming response receive message and said modem initialization specification from said called party mobile station to the second modem; and reestablishing a modem initialization specification required by said calling party mobile station.

22. The wireless data communication method claimed in claim 21, wherein initializing the second modem comprises:

deciding whether or not there is an idle resource in the second modem; and establishing a basic configuration value when there is an idle resource in the second modem.

23. A wireless data communication method in which at least one mobile switching center including a mobile connection control module, a mobile data path connection control module, a public network data path connection control module and a trunk connection control module are connected with at least one data network interworking unit by a first data path and a second data path, comprising:

inputting an identification number of a called party mobile station;

establishing a first call from a calling party mobile station to a mobile data network interworking unit and then establishing a first traffic channel;

calling the called party mobile station at the mobile data network interworking unit;

establishing a second call from said called party mobile station to the mobile data network interworking unit when a data response comes from said called party mobile station and then establishing a second traffic channel after the mobile data path connection module informs the public network data path connection control module of a normal state of a first data path between a mobile switching center and the mobile data network interworking unit;

establishing a call between the mobile switching center and the mobile data network interworking unit through a second data path; and connecting said first and second traffic channels through at least one modem of the interworking unit to perform circuit data service, wherein establishing said first and second calls and connecting the traffic channel comprises:

informing the public network data path connection control module by the mobile data path connection control module that said first data path is normally established;

establishing a call between the public network data path connection control module and the data network interworking unit through said second data path;

connecting a path of the first call with a path of the second call in the public network data path connection control module;

making the traffic channel between the mobile connection control module and the public network data path connection control module inactive;

receiving both a connection request message transmitted from said calling party mobile station through the mobile switching center and an incoming response message transmitted from said called party mobile station into the data network interworking unit;

connecting at least one modem equipped in the data network interworking unit which is assigned to link said connection request message and said incoming response message to each other; and confirming the connection of the at least one modem.

24. A wireless data communication method in which at least one mobile switching center having a mobile connection control module, a mobile data path connection control module, a public network data path connection control module and a trunk connection control module is connected with at least one data network interworking unit through a first data path and a second data path to perform circuit data service, comprising:

a) inputting an identification number of a called party mobile station;

b) establishing a first traffic channel after establishing a first call from a calling party mobile station to a first mobile data network interworking unit having at least one modem through a first mobile switching center;

c) calling a called party mobile station controlled by a second mobile switching center from said first mobile data network interworking unit through said public network data path connection control module and said trunk connection control module;

d) establishing a second traffic channel after a second call from said called party mobile station to a second mobile data network interworking unit having at least one modem is established when said called party mobile station responds and said mobile data path connection module informs said public network data path connection control module of a normal state of a first data path;

e) establishing a call between said public network data path connection control module and said second mobile data network interworking unit after said mobile data path connection control module informs said public network data path connection control module of the completion of channel establishment when said second traffic channel is completely established;

f) releasing the traffic channel between said mobile connection control module and said public network data path connection control module when the call establishment between the public network data path connection control module and said second mobile data network interworking unit is completed; and g) connecting said public network data path connection control module with the trunk connection control module, wherein the identification number of said called party mobile station is inputted by an ATD command and the data response is automatically generated by a preset automatic response mode or an ATA command.

25. The method of claim 24, wherein establishing the first traffic channel comprises:

initializing a first modem equipped in the data network interworking unit;

connecting a path between said calling party mobile station and the data network interworking unit to modem;

establishing a communication protocol between said calling party mobile station and the data networking unit;

transmitting the identification number of said calling party mobile station and said modem initialization specification from said calling party mobile station to the first modem; and reestablishing with a modem initialization specification required by said calling party mobile station.

26. The wireless data communication method claimed in claim 25, wherein initializing the first modem comprises:

deciding whether or not there is an idle resource in the first modem; and establishing a basic configuration value when there is an idle resource in the first modem.

27. A wireless data communication method in which at least one mobile switching center having a mobile connection control module, a mobile data path connection control module, a public network data path connection control module and a trunk connection control module is connected with at least one data network interworking unit through a first data path and a second data path to perform circuit data service, comprising:

a) inputting an identification number of a called party mobile station;

b) establishing a first traffic channel after establishing a first call from a calling party mobile station to a first mobile data network interworking unit having at least one modem through a first mobile switching center;

c) calling a called party mobile station controlled by a second mobile switching center from said first mobile data network interworking unit through said public network data path connection control module and said trunk connection control module;

d) establishing a second traffic channel after a second call from said called party mobile station to a second mobile data network interworking unit having at least one modem is established when said called party mobile station responds and said mobile data path connection module informs said public network data path connection control module of a normal state of a first data path;

e) establishing a call between said public network data path connection control module and said second mobile data network interworking unit after said mobile data path connection control module informs said pubic network data path connection control module of the completion of channel establishment when said second traffic channel is completely established;

f) releasing the traffic channel between said mobile connection control module and said public network data path connection control module when the call establishment between the public network data path connection control module and said second mobile data network interworking unit is completed; and g) connecting said public network data path connection control module with the trunk connection control module, wherein establishing said second traffic channel comprises:

initializing a second modem equipped in the data network interworking unit;

connecting a path between said called party mobile station and the data network inter-working unit to modem;

establishing a communication protocol between said called party mobile station and the data network interworking unit;

transmitting said incoming response receive message and said modem initialization specification from said called party mobile station to the second modem; and reestablishing a modem initialization specification required by said calling party mobile station.

28. The method of claim 27, wherein initializing the modem comprises:

deciding whether or not there is an idle resource in the second modem; and establishing a basic configuration value when there is an idle resource in the second modem.

29. A mobile data communication system, comprising:
at least one base station and base station controller, configured to receive and transfer a signal from at least one mobile station and a signal transmitted to the at least one mobile station in a prescribed service area;
a mobile switching center (MSC) configured to detect a service option included in the signal transmitted from the at least one base station and base station controller and to switch between a circuit data service and a packet data service based on the detected service option; and
at least one mobile data network interworking unit coupled to the MSC to establish a traffic channel of a mobile data path and a call between a calling party mobile station and a called party mobile station when said mobile switching center performs the circuit data service, wherein first and second data paths are established between the MSC and the least one mobile data network interworking unit.

30. The system of claim 29, wherein the at least one mobile data network interworking unit comprises:
a main processing circuit configured to form the traffic channel of the mobile data path and the call between the calling party mobile station and the called party mobile station;
a circuit data processing circuit configured to transmit the called party identification number to the main processing circuit if the main processing circuit is performing a circuit data service;
a packet data processing circuit configured to transmit the called party identification number to the main processing circuit if the main processing circuit is performing a packet data service;
an interface control section, configured to provide an interface between the main processing circuit and the circuit data processing circuit;
at least one modem; and
a modem controller configured to control an operation of the at least one modem according to a modem control signal of the interface control section.

31. The system of claim 29, wherein the at least one mobile data network interworking unit, comprises:
at least one processor;
at least one modem; and
a modem controller, configured to receive a modem control signal from the at least one processor and control the modem in accordance with the modem control signal.

32. The system of claim 31, wherein the communication system comprises a CDMA communication system.

33. The system of claim 29, wherein the mobile switching center comprises:
a mobile connection control module to detect a service option included in the signal transmitted from the at least one base station and base station controller, and to generate a switching signal to control an interface connection;
a mobile data path connection control module, configured to control a connection to a mobile network data path according to the switching signal of the mobile connection control module;
a public network data path connection control module, configured to control a connection to a public network data path according to an output signal of the mobile data network interworking unit; and
a trunk connection control module, configured to transmit an output signal of one of the public network data path connection control module and the mobile data path connection control module to one of a public switched telephone network and a second mobile switching center according to the output signal of the mobile data path control module or the public network data path connection control module.

34. The system of claim 29, wherein the at least one mobile data network interworking unit comprises:
a data path connector to couple to a mobile switching center;
a main processor to form a traffic channel of a mobile data path between a first mobile terminal and a second mobile terminal when a circuit data service option is detected by the mobile switching center from a base station;
a circuit data processor, coupled to the main processor and configured to analyze a signal transmitted from the first mobile terminal if a protocol between the first mobile terminal and the second mobile terminal is normally executed, and to transmit an identification number from the second terminal to the main processor; and
a switching circuit, configured to selectively switch a connection between the circuit data processor and the data path connector in accordance with a control signal from the main processor, wherein the circuit data processor comprises at least one modem, and wherein the main processor comprises:
a mobile data path control module coupled to establish a link with the mobile switching center;
a circuit data control module configured to control the exchange of traffic data information between the first mobile terminal and a circuit data processor;
a modem control module configured to control the at least one modem; and
a public network data path control module coupled to establish the link with the mobile switching center.

35. The system of claim 29, wherein the at least one mobile data network interworking unit comprises:
a data path connector to couple to a mobile switching center;
a main processor to form a traffic channel of a mobile data path between a first mobile terminal and a second mobile terminal when a circuit data service option is detected by the mobile switching center from a base station;
a circuit data processor, coupled to the main processor and configured to analyze a signal transmitted from the first mobile terminal if a protocol between the first mobile terminal and the second mobile terminal is normally executed, and to transmit an identification number from the second terminal to the main processor; and
a switching circuit, configured to selectively switch a connection between the circuit data processor and the data path connector in accordance with a control signal from the main processor, wherein the circuit data processor comprises at least one modem, and wherein the circuit data processor comprises:
an interface controller to provide an interface between the main processor and the circuit data processor; and
a modem controller coupled to control an operation of the at least one modem according to a modem control signal provided by the interface controller.

36. The system of claim 29, wherein the at least one mobile data network interworking unit comprises a module for providing circuit service and a module for providing packet based service, and wherein different protocol stacks are used for packet service and circuit service.

37. The system of claim 36, wherein the at least one mobile data network interworking unit comprises at least one module for connecting a first protocol to a second protocol for interface with the interworking function.

38. The method of claim 29, wherein the first data path is a mobile data path and the second data path is a public network data path.

39. A method of performing wireless data communications, comprising:
  inputting an identification number of a first mobile station, wherein the identification number of the first mobile station is inputted by an ATD command and the data response is automatically generated by a preset automatic response mode or an ATD command;
  establishing a first call from a second mobile station to a mobile data network interworking unit and then establishing a first traffic channel;
  calling the first mobile station at the mobile data network interworking unit;
  establishing a second call from the first mobile station to the mobile data network interworking unit when a data response comes from the first mobile station and then establishing a second traffic channel after a mobile data path connection module informs a public network data path connection control module of a normal state of the first data path;
  establishing a call between a mobile switching center and the mobile data network interworking unit through the second data path; and
  connecting the first and second traffic channels through at least one modem of the mobile data network interworking unit to perform circuit data service.

40. The method of claim 39, wherein the first data path is a mobile data path and the second data path is a public network data path.

* * * * *